(12) United States Patent
Han et al.

(10) Patent No.: US 12,524,794 B2
(45) Date of Patent: Jan. 13, 2026

(54) SYSTEM AND METHOD FOR QUESTION ANSWERING

(71) Applicant: Walmart Apollo, LLC, Bentonville, AR (US)

(72) Inventors: Kanyao Han, Champaign, IL (US); Komal Arvind Dhuri, Milpitas, CA (US); Deepa Mohan, Los Altos, CA (US); Shankara Bhargava, Santa Clara, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 291 days.

(21) Appl. No.: 18/374,315

(22) Filed: Sep. 28, 2023

(65) Prior Publication Data

US 2024/0104624 A1    Mar. 28, 2024

Related U.S. Application Data

(60) Provisional application No. 63/411,030, filed on Sep. 28, 2022.

(51) Int. Cl.
*G06Q 30/00* (2023.01)
*G06Q 30/0601* (2023.01)

(52) U.S. Cl.
CPC ............... *G06Q 30/0629* (2013.01)

(58) Field of Classification Search
CPC ....... G06Q 30/0629; G06N 3/08; G06N 3/045
See application file for complete search history.

(56) References Cited

U.S. PATENT DOCUMENTS

| | | | |
|---|---|---|---|
| 10,929,392 B1* | 2/2021 | Cheng | G06N 3/08 |
| 2019/0163818 A1 | 5/2019 | Mittal et al. | |
| 2019/0325068 A1 | 10/2019 | Lai et al. | |
| 2020/0364511 A1 | 11/2020 | Brown et al. | |
| 2022/0198154 A1* | 6/2022 | Liu | G06N 3/045 |
| 2024/0386039 A1* | 11/2024 | Noorizadeh | G06F 16/3329 |

OTHER PUBLICATIONS

Zope, B., et al., "Question Answer System: A State-of-Art Representation of Quantitative and Qualitative Analysis", Big Data Cogn. Comput. 2022, 6, 109, https://doi.org/10.3390/bdcc604019 Oct. 7, 2022.

* cited by examiner

*Primary Examiner* — Anand Loharikar
(74) *Attorney, Agent, or Firm* — DICKINSON WRIGHT RLLP; Hector A. Agdeppa

(57) ABSTRACT

A method including determining respective training data for each of query-type-specific answer retrieval modules. The method further can include training each of the query-type-specific answer retrieval modules. The method additionally can include determining a query type of a query from a user device for a user. The method also can include determining, in real-time and based at least in part on the query type, an answer retrieval module from the query-type-specific answer retrieval modules, as trained. Moreover, the method can include determining, in real-time by the answer retrieval module, one or more answers for the query. Then, the method can include ranking, in real-time, the one or more answers based on a user profile of the user. Finally, the method can include transmitting, via a computer network and to the user device, at least one of the one or more answers, as ranked. Other embodiments are disclosed.

20 Claims, 7 Drawing Sheets

400

410 Determining, in real-time by machine learning, a query type of a query from a user device for a user 411 Training a machine learning module to determine the query type of the query 420 Answerable?

430 Determining, in real-time and based at least in part on the query type, an answer retrieval module 440 Determining, in real-time by the answer retrieval module, one or more answers 441 Training the answer retrieval module based on training data corresponding to the query type.

450 Finalizing at least one of the one or more answers to be transmitted to the user 460 Transmitting, via a computer network and to the user device, the at least one of the one or more answers, as finalized 470 Receiving, via the computer network and from the user device, feedback for the at least one of the one or more answers 480 When the feedback is negative, transmitting, via the computer network and to the user device, a prompt message for retry 490 When the feedback is positive, transmitting, via the computer network and to the user device, a prompt message for an additional query

510 Determining one or more data sources for the training data corresponding to the query type from: (a) feature descriptions associated with products, or (b) discussions associated with the products and generated by members of an online forum

520 Generating query-context pairs of the training data from the one or more data sources

530 Generating a respective training query vector for a respective query of each of the query-context pairs of the training data

540 Generating a respective training context vector for a respective context of each of the query-context pairs of the training data

550 Determining a respective similarity score based on the respective training query vector and the respective training context vector

610 Ranking, in real-time, the one or more answers based on various factors, such as a user profile of the user, featured products and/or brands, policies, and/or the popularity of each answer, etc.

620 Determining, in real-time, the at least one of the one or more answers to be transmitted to the user based on one or more of: (a) a respective similarity score of each of the one or more answers, or (b) an answer limit

630 Refining, in real-time, the at least one of the one or more answers based at least in part on an answer length limit

710 Determining, based on data sources, respective training data for each of query-type-specific answer retrieval modules > 711 Determining a query-context pair associated with a discussion, based on the quality indication(s) for the context of the query-context pair

720 Training each of the query-type-specific answer retrieval modules, based on the respective training data and a respective input query type

730 Determining, in real-time by machine learning, a query type of a query

740 Answerable?  YES / NO

750 Determining, in real-time and based at least in part on the query type, an answer retrieval module

760 Determining, in real-time by the answer retrieval module, one or more answers

770 Ranking, in real-time, the one or more answers based on a user profile of the user

780 Transmitting, via a computer network and to the user device, at least one of the one or more answers, as ranked

790 Receiving, via the computer network and from the user device, feedback for the at least one of the one or more answers

FIG. 7

SYSTEM AND METHOD FOR QUESTION ANSWERING

CROSS-REFERENCE TO RELATED APPLICATIONS

This application claims priority to U.S. Provisional Patent Application No. 63/411,030, filed Sep. 28, 2022. U.S. Provisional Patent Application No. 63/411,030 is incorporated herein by reference in its entirety.

TECHNICAL FIELD

This disclosure relates generally to techniques for automatically generating answers for a user query related to products.

BACKGROUND

Conventional approaches of providing answers to a user query include retrieving the answers corresponding to predetermined frequently asked questions (FAQ). The answers in the predetermined FAQs generally are associated with objective information, such as product features (e.g., the length of a belt or the color of lipstick, etc.), but not subjective recommendations (e.g., brand recommendations or tips on how to use a product, etc.). The conventional approaches thus are limited in scope of the types of queries that the approaches can handle. Systems and methods for providing not only objective information but also subjective recommendations in response to user queries of different types are desired.

BRIEF DESCRIPTION OF THE DRAWINGS

To facilitate further description of the embodiments, the following drawings are provided in which:

FIG. 4 illustrates a flow chart for a method for providing machine-generated answers to user queries, according to another embodiment;

FIG. 5 illustrates a flow chart for an exemplary method for determining training data from one or more data sources for training the answer retrieval module in FIG. 4, according to an embodiment;

FIG. 6 illustrates a flow chart for an exemplary method for finalizing one or more answers to a user query to be transmitted to the user in FIG. 4, according to an embodiment; and FIG. 7 illustrates a flow chart for another method for providing machine-generated answers to user queries, according to an embodiment.

Figure 1:
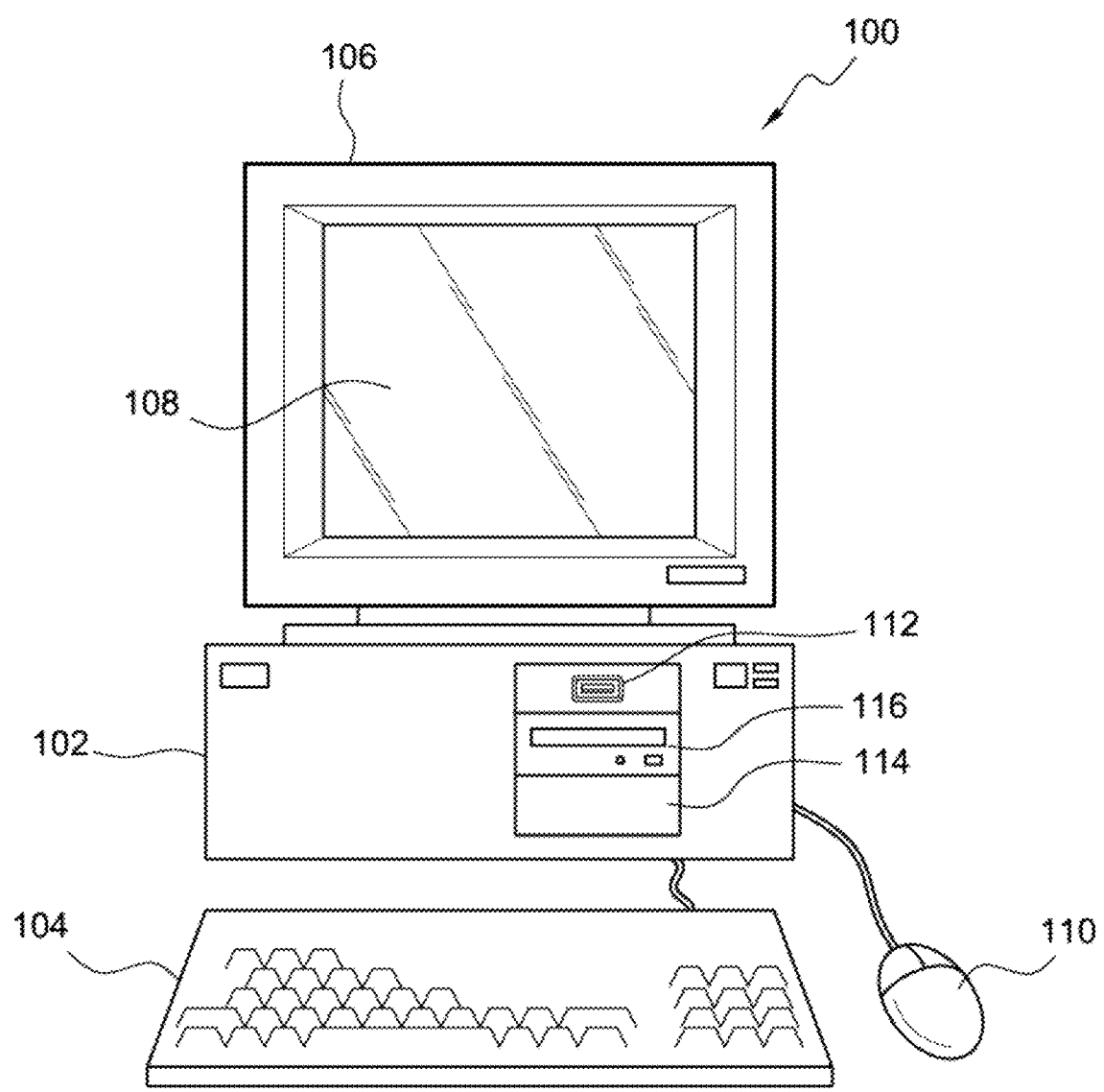
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, ten seconds, thirty seconds, one minute, five minutes, ten minutes, etc.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Figure 2:
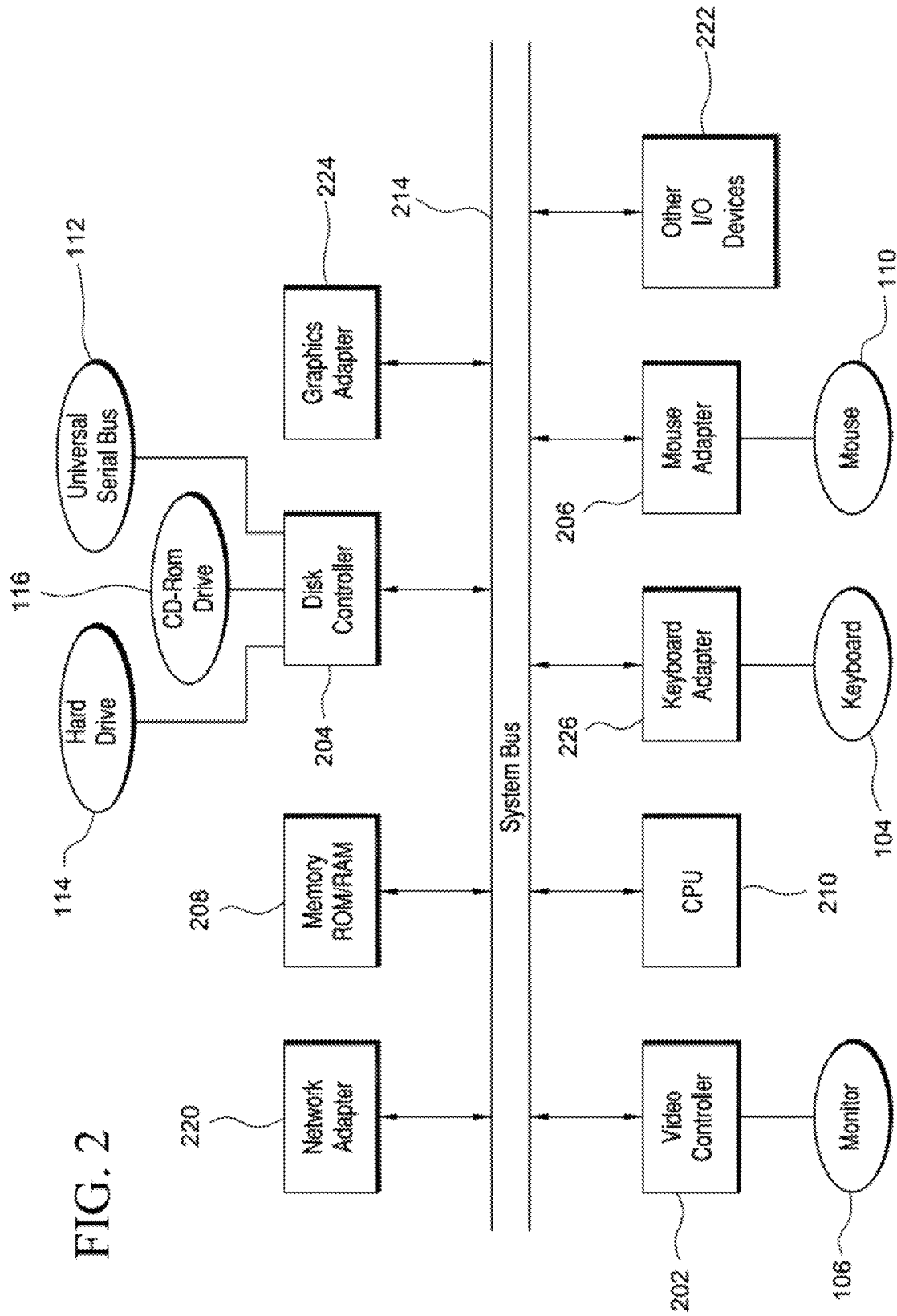
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can includes one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computer system 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
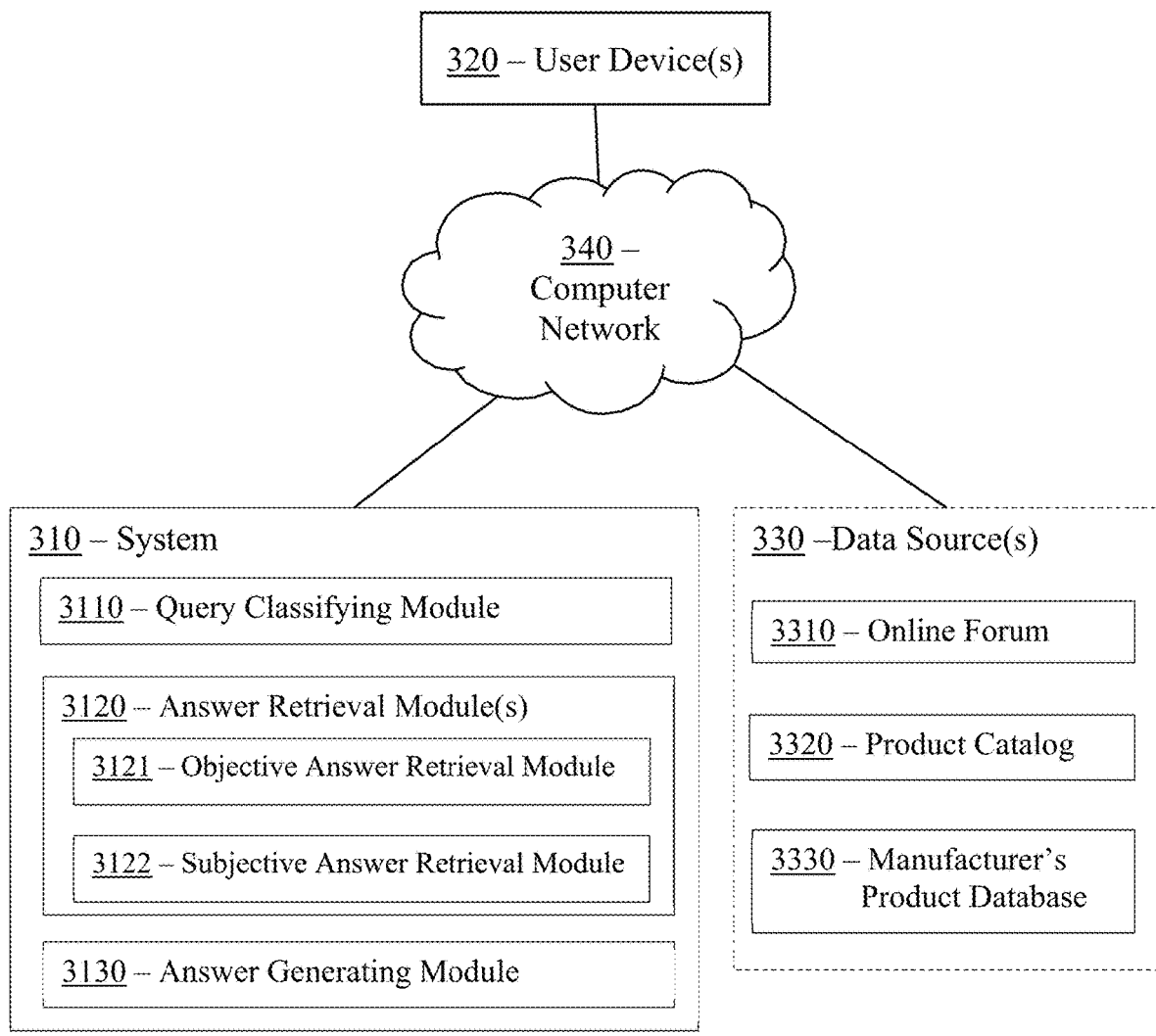
FIG. 3 illustrates a system for generating real-time answers to user queries, according to an embodiment.

Turning ahead in the drawings, FIG. 3 illustrates a block diagram of a system 300 that can be employed for answering questions asked by users or potential buyers, according to an embodiment. In various embodiments, the questions can be associated with products offered for sale by an online retailer. In some embodiments, the questions can include general questions and/or specific questions. Exemplary general questions can include requests for product recommendation (e.g., deodorants for sweaty male, or shoes designed for transgender women, etc.), and/or questions about active ingredient commonly used in certain products (e.g., hair growth shampoos, pain relief patches, or sunscreens for face, etc.). Exemplary specific questions about products can include questions about a feature of a product (e.g., the colors or sizes for a t-shirt, or the water-resistance rating of a smart phone, etc.), requests for tips on how to use the product (e.g., how to hang picture frames using a certain double-sided tape, or how to use a certain face roller, etc.), and so forth. In a number of embodiments, the questions can be categorized into different types. Examples of the query or question types can include objective questions (e.g., requests for information such as the ingredients of a food product, the sizes of a jacket, the benefits of biotin used in shampoos, etc.) and/or subjective questions (e.g., requests for recommendations or opinions such as product recommendations for blemish-prone skin, tips for using a product, etc.).

System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. System 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein. In many embodiments, operators and/or administrators of system 300 can manage system 300, the processor(s) of system 300, and/or the memory storage unit(s) of system 300 using the input device(s) and/or display device(s) of system 300, or portions thereof in each case.

In many embodiments, system 300 can include a system 310 and/or one or more user device(s) 320. System 310 further can include one or more elements, modules, or systems, such as a query classifying module 3110, one or more answer retrieval modules 3120 (e.g., an objective answer retrieval module 3121 and/or a subjective answer retrieval module 3122), and/or an answer generating module 3130, to perform various procedures, processes, and/or activities of system 300 and/or 310. System 310, user device(s) 320, query classifying module 3110, answer retrieval module(s) 3120, objective answer retrieval module 3121, subjective answer retrieval module 3122, and/or answer generating module 3130 can each be a computer system, such as computer system 100 (FIG. 1), as described above, and can each be a single computer, a single server, or a cluster or collection of computers or servers, or a cloud of computers or servers. In another embodiment, a single computer system can host system 310 and/or user device(s) 320. Additional details regarding system 310, user device(s) 320, query classifying module 3110, answer retrieval module(s) 3120, objective answer retrieval module 3121, subjective answer retrieval module 3122, and/or answer generating module 3130 are described herein.

In some embodiments, system 310 can be in data communication with user device(s) 320, using a computer network (e.g., computer network 340), such as the Internet and/or an internal network that is not open to the public. Meanwhile, in many embodiments, system 310 and/or user device(s) 320 also can be configured to communicate with and/or include one or more data sources (e.g., an external or internal database, one or more data source(s) 330, an online forum 3310, a product catalog 3320, and/or a manufacturer's product database 3330, etc.). In certain embodiments, the one or more data sources can include online forum 3310 that contains various information, including posts by members of an online community (e.g., Reddit® by Redidit, Inc. of San Francisco, California, United States of America, Digg® by Digg Inc. of New York, New York, United States of America, Slashdot® by BIZX, LLC of San Diego, California, United States of America, etc.) and some posts can be associated with products and have comments for the posts, forming threads of discussion associated with the products. The one or more data sources further can include product catalog 3320 of a retailer that contains information about products, items, or SKUs (stock keeping units), for example, among other data as described herein. In another example, the one or more data sources also can include manufacturer's product database 3330, that contains information about the products by the manufacturer.

In a number of embodiments, the one or more data sources can be databases stored on one or more memory storage units (e.g., non-transitory computer readable media), which can be similar or identical to the one or more memory storage units (e.g., non-transitory computer readable media)

described above with respect to computer system 100 (FIG. 1). Also, in some embodiments, for any particular database of the one or more data sources, that particular database can be stored on a single memory storage unit or the contents of that particular database can be spread across multiple ones of the memory storage units storing the one or more databases, depending on the size of the particular database and/or the storage capacity of the memory storage units. In similar or different embodiments, the one or more data sources can each be a computer system, such as computer system 100 (FIG. 1), as described above, and can each be a single computer, a single server, or a cluster or collection of computers or servers, or a cloud of computers or servers.

The one or more data sources can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

In many embodiments, communication between system 310, user device(s) 320, data source(s) 330, online forum 3310, product catalog 3320, and/or manufacturer's product database 3330 can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc.

The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, system 310 can determine, in real-time by machine learning (e.g., query classifying module 3110), a query type of a query received via a computer network (e.g., computer network 340) from a user device (e.g., user device(s) 320) for a user. In certain embodiments, the query type can be objective, subjective, and/or not-answerable. For instance, queries that are determined to be not-answerable can include queries that contain one or more issues, such as incomplete sentences, unknown terms, too many questions in each sentence, ambiguous or indefinite user intents, and so forth. In some embodiments, a query type further can include sub-query types. For example, subjective queries can be grouped into sub-query types: brand recommendation, product recommendation, product using tips, and socially responsible recommendations and tips for minority groups. System 310 and/or query classifying module 3110 can be pre-trained to determine the query type of the query. The training data for training system 310 and/or query classifying module 3110 can be generated or manually selected from various data sources (e.g., data source(s) 330, online forum 3310, product catalog 3320, and/or manufacturer's product database 3330). System 310 and/or query classifying module 3110 can determine the query type by any suitable Natural-Language-Processing (NLP) algorithms and/or models (e.g., Bidirectional Encoder Representations from Transformers (BERT), Robustly Optimized BERT Pre-training Approach (RoBERTa), Generative Pre-trained Transformer (GPT), GPT-2, GPT-3, Text-to-Text Transfer Transformer (T5), etc.).

In certain embodiments, when the query type is not-answerable, system 310 further can transmit, via computer network 340 and to user device(s) 320, a message for retry to facilitate a display of the message for retry on a graphical user interface on user device(s) 320. The message for retry can be: "I'm sorry, but I don't understand. Can you ask again?", as an example. In various embodiments, the display of the message on the graphical user interface can be in any suitable forms or by any suitable methods, including the rendering of a computer-generated speech for and/or the showing of the at least one of the one or more answers on the graphical user interface.

In some embodiments, system 310 further can determine, in real-time and based at least in part on the query type, an answer retrieval module (e.g., answer retrieval module(s) 3120, objective answer retrieval module 3121, or subjective answer retrieval module 3122) from: (a) one or more objective answer retrieval modules (e.g., objective answer retrieval module 3121), or (b) one or more subjective answer retrieval modules (e.g., subjective answer retrieval module 3122). In several embodiments, a single answer retrieval module or system can include the one or more objective answer retrieval modules and the one or more subjective answer retrieval modules.

In many embodiments, system 310 additionally can determine, in real-time by the answer retrieval module, one or more answers for the query. The answer retrieval module can use any suitable NLP algorithms and/or models to determine the one or more answers (e.g., Dense Passage Retrieval (DPR), TF-IDF, BM25, Sentence Transformers, etc.). In a number of embodiments, the one or more objective answer retrieval modules (e.g., objective answer retrieval module 3121) and/or the one or more subjective answer retrieval modules (e.g., subjective answer retrieval module 3122) can use similar or different algorithms and/or models. The answer retrieval module can include a machine learning module pre-trained based on training data from one or more data sources for the query type (e.g., data source(s) 330, online forum 3310, product catalog 3320, and/or manufacturer's product database 3330). For instance, an answer retrieval module for an objective query type can be trained based on one or more of product catalog 3320 and/or manufacturer's product database 3330. An answer retrieval module for a subjective query type can be trained based on online forum 3310, as an example.

In a number of embodiments, system 310 further can finalize, in real-time, the one or more answers to be transmitted to the user. Finalizing the one or more answers can include ranking, in real-time, the one or more answers, based on various factors, such as a user profile of the user, featured products and/or brands by system 310, policies of system 310, and/or the popularity of each answer, etc. The user profile of the user can include various information about the user, such as the user's age, gender, race, sexual orientation, residence address, engagement history of transactions, browses, searches, subscriptions, and/or queries, and/or preferences provided by the user and/or obtained from the engagement history. In some embodiments, finalizing the one or more answers further can include determining in real-time, at least one of the one or more answers to be transmitted to the user based on one or more of: (a) a respective similarity score between the query and each of the one or more answers, or (b) an answer limit. For example, system 310 can be configured to provide answers with a respective similarity score at least as high as a predetermined threshold (e.g., 0.60, 0.77, 0.85, 0.90, etc.). In another example, system 310 can be configured to provide a single best answer or top-K answers, wherein 1 or K is the answer limit (e.g., top-3, top-5, top-10, etc.). In yet another example, system 310 can be configured to provide the top-K answers of those with a respective similarity score at least as high as the predetermined threshold. The answer limit and/or the predetermined threshold can each be predetermined and fixed or configurable by the user.

In several embodiments, finalizing the one or more answers further can include refining, in real-time, the at least one of the one or more answers to be submitted to the user based at least in part on an answer length limit (e.g., 300 words, 500 words, etc.). System 310 can be configured to automatically fine-tune, in real-time, the at least one of the one or more answers by any suitable NLP algorithms and/or models (e.g., GPT-2, GPT-3, T5, BERT, Sentence Transformers, DPR, RoBERTa, etc.) so that the at least one of the one or more answers, as finalized, does not exceed the answer length limit.

In many embodiments, system 310 further can transmit, via computer network 340 and to user device(s) 320, the at least one of the one or more answers, as finalized (e.g., ranked and/or refined), to facilitate a display of the at least one of the one or more answers, as finalized, on the graphical user interface on user device(s) 320. In some embodiments, system 310 also can, after transmitting the at least one of the one or more answers, receive, via computer network 340 and from user device(s) 320, feedback for the at least one of the one or more answers. System 310 can be configured request the feedback by causing the graphical user interface of user device(s) 320 to display a message, such as "Does that answer your question?".

In a number of embodiments, when the feedback is positive (e.g., the feedback includes "Yes," "Affirmative," or "Positive", etc.), system 310 can transmit, via computer network 340 and to user device(s) 320, a message for an additional query to facilitate a display of the message for the additional query on the graphical user interface. For example, the message for the additional query can be: "What else can I help you with?", or "Can I help you with any other questions?", etc.

When the feedback is negative (e.g., the feedback includes "No", "Negative", "Nope", or "I am good," etc.), system 310 can transmit, via computer network 340 and to user device(s) 320, a message for retry to facilitate a display of the message for retry on the graphical user interface. Exemplary message for retry can include: "Do you want to try again?", "Can you please ask again?," "I am sorry, can you try re-wording your question?", etc. In certain embodiments, system 310 can be configured to allow a limited number (e.g., 2, 3, or 4, etc.) of retries. The message for retry can be the same or different for each retry. When the user has used up the limited number of retries, system 310 can be configured to respond with a final message (e.g., "Apologies, but I do not seem to be understanding your question. You may find your answer at . . . ") and stop or suggest the user to ask a different question.

Turning ahead in the drawings, FIG. 4 illustrates a flow chart for a method 400 of automatically answering a user query, according to an embodiment. Method 400 is merely exemplary and is not limited to the embodiments presented herein. Method 400 can be employed in many different embodiments or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped.

In many embodiments, system 300 (FIG. 3) or system 310 (FIG. 3) can be suitable to perform method 400 and/or one or more of the activities of method 400. In these or other embodiments, one or more of the activities of method 400 can be implemented as one or more computing instructions configured to run at one or more processors and configured to be stored at one or more non-transitory computer readable media. Such non-transitory computer readable media can be part of a computer system such as system 300 (FIG. 3) or system 310 (FIG. 3). The processor(s) can be similar or identical to the processor(s) described above with respect to computer system 100 (FIG. 1).

Referring to FIG. 4, method 400 can include a block 410 of determining, in real-time by machine learning, a query type of a query from a user device (e.g., user device(s) 320 (FIG. 3)) for a user. Block 410 can be implemented by any suitable machine learning modules (e.g., query classifying module 3110 (FIG. 3), BERT, Facebook AI Similarity Search (FAISS), etc.) to determine the query type (e.g., not-answerable, product features, manufacturer information, brand recommendation, product recommendation, product using tips, socially responsible recommendations, or tips for minority groups, etc.).

In several embodiments, method 400 and/or block 410 further can include a block 411 of training the machine learning module in block 410 (e.g., query classifying module 3110 (FIG. 3)) to determine the query type of the query. Block 411 can include training the machine learning module based on training data selected or generated from the one or more data sources (e.g., data source(s) 330 (FIG. 3), online forum 3310 (FIG. 3), product catalog 3320 (FIG. 3), and/or manufacturer's product database 3330 (FIG. 3), etc.). In a few embodiments, block 411 can train the machine learning module repeatedly until the accuracy of the outputs (e.g., the $F_1$ score) of the machine learning module reaches a certain level (e.g., 0.92, 0.95, 0.96, 0.98, etc.).

In some embodiments, method 400 can include block 420 of determining whether the query type, as determined, is answerable or not. When block 420 determines that the query type is not-answerable, as shown in FIG. 4, method 400 can do nothing and wait for another query from the user device. In certain embodiments (not shown in FIG. 4), method 400 can transmit, via a computer network (e.g., computer network 340 (FIG. 3)) and to the user device (e.g., user device(s) 320 (FIG. 3)) for the user, a message for retry to facilitate a display of the message for retry on a graphical user interface on the user device, before going back to wait for the next query in block 410. In a few embodiments, the message for retry may include a reason that the query may be not-answerable, such as an unknown term in the query, too many questions in the seemingly single query, ambiguous user intent, or too much background noise in a voice command, etc.

In many embodiments, when block 420 determines that the query type is any type other than not-answerable, method 400 further can include a block 430 of determining, in real-time and based at least in part on the query type, an answer retrieval module from: (a) one or more objective answer retrieval modules (e.g., answer retrieval module(s) 3120 (FIG. 3) and/or objective answer retrieval module 3120 (FIG. 3)), or (b) one or more subjective answer retrieval modules (e.g., answer retrieval module(s) 3120 (FIG. 3) and/or subjective answer retrieval module 3122 (FIG. 3)). The one or more objective answer retrieval modules and one or more subjective answer retrieval modules can each be implemented by the same or different algorithms and/or models (e.g., DPR, BM25, etc.), based on the same or different data sources (e.g., data source(s) 330 (FIG. 3), online forum 3310 (FIG. 3), product catalog 3320 (FIG. 3), and/or manufacturer's product database 3330 (FIG. 3), etc.).

Still referring to FIG. 4, in a number of embodiments, method 400 further can include a block 440 of determining, in real-time by the answer retrieval module, one or more answers for the query. The answer retrieval module can be configured to determine the one or more answers based on a respective similarity score between the query and each of the one or more answers. The respective similarity score can be derived based on: (a) a query vector generated by a query encoding module (e.g., BERT encoder, RoBERTa encoder, etc.) for the query, and (b) a respective context vector generated by a context encoding module (e.g., BERT encoder, RoBERTa encoder, etc.) for each of the one or more answers. In certain embodiments, the respective similarity score can be determined by a dot product of the query vector and the respective context vector. An exemplary equation can be:

$$\text{sim}(q,p)=E_Q(q)^T E_P(p),$$

wherein:
sim(q, p): the respective similarity score between a query and an answer;
q: the query;
p: the answer;
$E_Q$: the query vector for the query; and
$E_P$: the query vector for the answer.

In many embodiments, method 400 and/or block 440 additionally can include a block 441 of training the answer retrieval module (e.g., answer retrieval module(s) 3120 (FIG. 3), objective answer retrieval module 3121 (FIG. 3), subjective answer retrieval module 3122 (FIG. 3), etc.) based on training data corresponding to the query type to determine the one or more answers for the query. In several embodiments, block 441 can include training the query encoding module to generate a respective training query vector for a respective query of each of query-context pairs of the training data; and/or training the context encoding module to generate a respective training context vector for a respective context of each of the query-context pairs of the training data.

In an exemplary embodiment as shown in FIG. 5, block 441 can include a block 510 of determining one or more data sources (e.g., data source(s) 330 (FIG. 3), online forum 3310 (FIG. 3), product catalog 3320 (FIG. 3), and/or manufacturer's product database 3330 (FIG. 3)) for the training data corresponding to the query. The training data can be retrieved and/or generated from: (a) feature descriptions associated with products in the one or more data sources (e.g., data source(s) 330 (FIG. 3), product catalog 3320 (FIG. 3), and/or manufacturer's product database 3330 (FIG. 3)); and/or (b) discussions that are associated with the products and generated by members of an online forum (e.g., data source(s) 330 (FIG. 3) and/or online forum 3310 (FIG. 3)). For example, when the query type is objective, the training data can be generated from product feature descriptions, and when the query type is subjective, the training data can be generated from the discussion of the online forum or multiple online forums.

In several embodiments, block 441 further can include a block 520 of generating query-context pairs of the training data from the one or more data sources. Block 520 can include generating the query-context pairs of the training data by a system administrator or operator, and/or by a computer system (e.g., system 300 (FIG. 3), system 310 (FIG. 3), or computer system 100 (FIG. 1), etc.). In some embodiments, block 520 can generate the query-context pairs by any suitable templates and/or NLP modules or systems of the computer system and allow the system administrator or operator to fine-tune the query-context pairs. In certain embodiments, block 520 can include generating, by the computer system, the query-context pairs of the training data for an objective query type from a product feature (e.g., size, color, brand, package size, special feature(s), etc.) and the feature's corresponding value (e.g., S-XL, black/white/red/green/blue, "Great Value"® or "Equate"®, a pack of 3, water-resistant and/or long battery life, etc.) for a product in one or more objective data sources (e.g., data source(s) 330 (FIG. 3), product catalog 3320 (FIG. 3), or manufacturer's product database 3330 (FIG. 3)). Examples of the query-context pairs generated in block 520 can include ("How many items are in a single pack?", "There are 3 items in this pack."), ("Is this Apple Watch waterproof?", "This Apple Watch is water resistant up to 50 meters, but not waterproof."), and so forth.

In a number of embodiments, block 520 further can include deriving, by the computer system, the query-context pairs of the training data for a subjective query type from the discussions in one or more subjective data sources (e.g., data source(s) 330 (FIG. 3) and/or online forum 3310 (FIG. 3)). Block 520 can derive or generate the query-context pairs by determining the discussions for the training data from threads of an online forum based at least in part on one or more of: (a) whether a thread of the threads from the online forum comprises at least one top-level comment corresponding to a query post of the thread; or (b) a respective review, author, status, or length of the at least one top-level comment of the thread.

In many embodiments, a thread of an online forum can include a query post with a question in the title and/or content of the query post (e.g., "What is the best eyeliner?" or "Any recommendation for men's hiking shoes?", etc.) and one or more corresponding comments that appear to answer the question. Generally, top-level comments, including comments directly responding to the query post (e.g., first-level comments) and/or those not too deep into the discussion (e.g., second-level or third-level comments that directly respond to the first-level or second-level comments), are more relevant to the question in the query post. As such, the training data can be derived from threads that each comprise one or more top-level comments (e.g., first- and second-level comments, or first- to third-level comments, etc.) corresponding the a respective query post. In some embodiments, a query-context pair of the training data, as generated by block 520 corresponding to a thread associated with a product or products, can comprise: (a) the query post of the thread as the query of the query-context pair, and (b) the at least one top-level comment for the query post as the context of the query-context pair.

Further, in some embodiments, block 520 can derive the query-context pairs from the threads that include comments of good quality. For example, in an online forum that allows reviews or ratings for the comments, threads that include query posts and comments with better reviews or ratings (e.g., a 3.5- or 4-star out of 5 rating, etc.) generally can indicate answers of good quality and thus can be used for training purposes. In certain embodiments, the author, status, or length of a comment also can be used to determine the quality of the comment. For example, when the author is a known bot, when the comment is removed or flagged as violating the forum policy, and/or when the comment is short (e.g., less than 10 or 50 words, etc.), the comment can be determined to be of little use as an answer and be discarded. Additionally, when a thread includes a query post and multiple top-level comments of good quality, block 520 can generate the query-context pair based on the query post as the query and a combination of the multiple top-level comments as the context.

In a number of embodiments, block 441 further can include a block 530 of generating a respective training query vector for a respective query of each of the query-context pairs of the training data. The respective training query vector for the respective query can be generated by any of the aforementioned query encoding modules (e.g., a BERT encoder). Block 441 also can include a block 540 of generating a respective training context vector for a respective context of each of the query-context pairs of the training data. The respective training context vector for the respective context can be generated by any of the aforementioned context encoding modules (e.g., a BERT encoder).

In many embodiments, block 441 further can include a block 550 of determining a respective similarity score between the respective query and the respective context based on the respective training query vector and the respective training context vector. Block 550 can use any suitable algorithms to determine the respective similarity score between the respective query and the respective context, including the equation for determining sim(q, p) above. In some embodiments, block 441 further can repeat some or all of the training activities (e.g., blocks 530, 540, and/or 550) to optimize the answer retrieval module. For example, block 441 can repeat blocks 530, 540, and/or 550 to: (a) fine-tune the module(s) for generating the respective training query vector and/or the respective training context vector for the respective query, and/or (b) adjust the weights given to the respective training query vector and the respective training context vector, or their respective elements, in the equation for determining the respective similarity score, in order to maximize the respective similarity score.

In a number of embodiments, block 441 further can include verifying the answer retrieval module, as trained. In several embodiments, the training data further can include verifying data. The verifying data also can be determined in block 510 and include query-context pairs generated in block 520. The verifying data can be used for the system administrator or operator or the computer system to determine whether the answer retrieval module, as trained, is optimized. For example, the training data can include X query-context pairs (e.g., 3000 query-context pairs) for training the answer retrieval module and Y query-context pairs (e.g., 1000 query-context pairs) for verifying. To verify the answer retrieval module, block 441 can feed the respective query of each of the Y query-context pairs to the answer retrieval module to determine one or more respective answers to the respective query. Then block 441 can determine, by the computer system (e.g., system 300 (FIG. 3), system 310 (FIG. 3), or computer system 100 (FIG. 1)) and/or by the system administrator or operator, whether the answer retrieval module is well trained based on how similar the one or more respective answers are to the respective context corresponding to the respective query of the of each of the Y query-context pairs.

Referring back to FIG. 4, after the one or more answers are determined (e.g., block 440), method 400 further can include a block 450 of finalizing at least one of the one or more answers to be transmitted to the user. In a number of embodiments, block 450 can include the activities shown in FIG. 6 to finalize the at least one of the one or more answers. Block 450 can include a block 610 of ranking, in real-time, the one or more answers based on various factors, such as a user profile of the user, featured products and/or brands, policies of the retailer, and/or the popularity of the answer(s), etc. For example, block 610 can rank the one or more answers based on: (a) the user's preference associated the product(s) determined from the transaction history of the user, (b) whether an answer is related to the products and/or brands that the retailer sells and/or promotes, (c) whether there are any linguistic cues of toxic or offensive languages in an answer that may violate a policy of the retailer, and/or (d) how popular an answer is based on community voting information (e.g., the number of thumbs-ups), etc.

In some embodiments, block 450 further can include a block 620 of determining, in real-time, at least one of the one or more answers to be transmitted to the user based on one or more of: (a) a respective similarity score of each of the one or more answers, or (b) an answer limit. In a few embodiments, block 620 can determine the at least one of the one or more answers to each includes a respective similarity score that is at least as high as a predetermined threshold (e.g., 0.79, 0.88, 0.95, etc.) and/or among the best-K answers, (e.g., the best answer, or the top-3 or top-5 answer, etc.).

In a number of embodiments, block 450 further can include a block 630 of refining, in real-time, the at least one of the one or more answers based at least in part on an answer length limit (e.g., 100 words, 350 words, or 400 words, etc.). Refining the at least one of the one or more answers can be implemented by any suitable NLP algorithms and/or models (e.g., GPT-2, GPT-3, etc.).

Referring back to FIG. 4, method 400 further can include a block 460 of transmitting, via the computer network (e.g., computer network 340 (FIG. 3)) and to the user device (e.g., user device(s) 320 (FIG. 3)), at least one of the one or more answers, as finalized (e.g., ranked and/or refined). The at least one of the one or more answers, as finalized, can be transmitted to the user device to facilitate a display of the at least one of the one or more answers, as finalized, on a graphical user interface on the user device. In some embodiments, the display of the at least one of the one or more answers, as finalized, can include streaming a computer-generated audio clip for the at least one of the one or more answers on the user device.

In some embodiments, method 400 further can include a block 470 of receiving, via the computer network (e.g., computer network 340 (FIG. 3)) and to the user device (e.g., user device(s) 320 (FIG. 3)), feedback for the at least one of the one or more answers. In certain embodiments, block 470 further can include before receiving the feedback, transmitting, via the computer network and to the user device, a message to invite the feedback from the user. For example, the message to invite the feedback can include "Does that answer your question?", and the feedback can include an option between "Yes" and "No", and/or an input text.

In many embodiments, after the feedback is received in block 470, method 400 additionally can include a block 480 of when the feedback is negative, transmitting, via the computer network (e.g., computer network 340 (FIG. 3)) and to the user device (e.g., user device(s) 320 (FIG. 3)), a message for retry to facilitate a display of the message for retry on the graphical user interface. For example, the message for retry in block 480 can include a suggestion to re-word or re-phrase the query or change to another query so that method 400 can go back to block 410 and try again.

In a number of embodiments, after the feedback is received in block 470, method 400 further can include a block 490 of when the feedback is positive, transmitting, via the computer network (e.g., computer network 340 (FIG. 3)) and to the user device (e.g., user device(s) 320 (FIG. 3)), a message for an additional query to facilitate a display of the message for the additional query on the graphical user interface. For example, the message for the additional query in block 490 can include an invitation to ask the additional query and go back to block 410 and/or an option to stop method 400.

In several embodiments, method 400 further can include additional or alternate activities. For example, in some embodiments, after the at least one of the one or more answers are determined or finalized in blocks 440 and/or 450, and/or after receiving a positive feedback in block 470, method 400 further can include building a taxonomy that link queries and answers in a product catalog (e.g., data source(s) 330 (FIG. 3), product catalog 3320 (FIG. 3), and/or manufacturer's product database, etc.) to improve product recommendations. In a few embodiments, when the feedback received in block 470 is negative repeatedly (e.g., 3 or 5 times in a row), method 400 can stop, rather than performing block 480 as in FIG. 4.

Turning ahead in the drawings, FIG. 7 illustrates a flow chart for a method 700 of automatically answering a user query, according to an embodiment. Method 700 is merely exemplary and is not limited to the embodiments presented herein. Method 700 can be employed in many different embodiments or examples not specifically depicted or described herein. In some embodiments, the procedures, the processes, and/or the activities of method 700 can be performed in the order presented. In other embodiments, the procedures, the processes, and/or the activities of method 700 can be performed in any suitable order. In still other embodiments, one or more of the procedures, the processes, and/or the activities of method 700 can be combined or skipped. In a number of embodiments, method 700 can be similar, entirely or partially, to method 400 (FIG. 4). For example, the procedures, the processes, and/or the activities of method 700 can be similar or different from those of method 400 (FIG. 4).

In many embodiments, system 300 (FIG. 3) or system 310 (FIG. 3) can be suitable to perform method 700 and/or one or more of the activities of method 700. In these or other embodiments, one or more of the activities of method 700 can be implemented as one or more computing instructions configured to run at one or more processors and configured to be stored at one or more non-transitory computer readable media. Such non-transitory computer readable media can be part of a computer system such as system 300 (FIG. 3) or system 310 (FIG. 3). The processor(s) can be similar or identical to the processor(s) described above with respect to computer system 100 (FIG. 1).

Referring to FIG. 7, method 700 can include a block 710 of determining, based on data sources (e.g., data source(s) 330 (FIG. 3)), respective training data for each of query-type-specific answer retrieval modules (e.g., answer retrieval module(s) 3120 (FIG. 3), objective answer retrieval module 3121 (FIG. 3), subjective answer retrieval module 3122 (FIG. 3), etc.). In many embodiments, block 710 can be similar or identical to block 510 (FIG. 5). The data sources can include various information about products featured on an ecommerce platform (e.g., system 300 (FIG. 3) or system 310 (FIG. 3)). For example, the data sources can include: (a) feature descriptions associated with products stored in product catalogs (e.g., product catalog 3320 (FIG. 3)) and/or product database (e.g., manufacturer's product database 3330 (FIG. 3)); and/or (b) discussions that are associated with the products and generated by members of one or more online forums (e.g., online forum 3310 (FIG. 3)). The respective training data for each of the query-type-specific answer retrieval modules can include query-context pairs, such as ("How to wash this item?", "Hand-wash or wash on your machine's gentle cycle in cool water."), ("Can you recommend a wireless gaming mouse?", "Brand A makes one of the best wireless gaming mice out there."), and so forth.

In a number of embodiments, block 710 further can include a block 711 of determining a query-context pair associated with a discussion, based on the quality indication(s) for the context of the query-context pair. Block 710 can be similar or identical to block 520 (FIG. 5). In embodiments where the respective training data for an answer retrieval module are retrieved from one or more data sources including discussions generated by members of the online forum(s), determining the respective training data based on the discussions of the data source(s) in block 710 can include selecting a respective query and a respective context of each of query-context pairs of the respective training data based on one or more respective quality indications for the respective context. Examples of the quality indications for the respective context of a query-context pairs can include: (a) whether a thread of the threads or discussions from the online forum comprises at least one top-level comment (e.g., top-2 comments, top-5 comments, etc., determined in chronological order) corresponding to a query post of the thread; and/or (b) a respective review, author, status, or length of the at least one top-level comment of the thread.

In many embodiments, method 700 further can include a block 720 of training each of the query-type-specific answer retrieval modules (e.g., answer retrieval module(s) 3120 (FIG. 3), objective answer retrieval module 3121 (FIG. 3), subjective answer retrieval module 3122 (FIG. 3), etc.), based on the respective training data and a respective input query type (e.g., non-answerable, objective, subjective, etc.). Block 720 can be similar or identical to block 441 (FIG. 4). In several embodiments, block 720 can include training a respective query encoding module (e.g., block 530 (FIG. 5)) to generate a respective training query vector for the respective query of each of the query-context pairs of the respective training data for each of the query-type-specific answer retrieval modules. In certain embodiments, block 720 further can include training a respective context encoding module (e.g., block 540 (FIG. 5)) to generate a respective training context vector for the respective context of each of the query-context pairs of the respective training data for each of the query-type-specific answer retrieval modules.

In some embodiments, method 700 also can include a block 730 of determining, in real-time by machine learning (e.g., by query classifying module 3110 (FIG. 3)), a query type of a query received via a computer network (e.g., computer network 340 (FIG. 3)) from a user device (e.g., user device(s) 320 (FIG. 3)) for a user. Block 730 can be similar or identical to block 410 (FIG. 4) and can be implemented by any suitable machine learning modules (e.g., BERT, FAISS, etc.) to determine the query type (e.g., not-answerable, objective (e.g., product features, manufacturer information, etc.), or subjective (e.g., brand recommendation, product using tips, etc.)).

In several embodiments, method 700 and/or block 730 further can include training (e.g., block 411 (FIG. 4)) a machine learning module (e.g., query classifying module 3110 (FIG. 3)) to determine the query type of a query. The training data for training this machine learning module can be selected or generated from the one or more data sources (e.g., data source(s) 330 (FIG. 3), online forum 3310 (FIG. 3), product catalog 3320 (FIG. 3), and/or manufacturer's product database 3330 (FIG. 3), etc.) that are similar or different from the data sources used in block 710. In certain embodiments, examples of queries determined in block 730 to be not-answerable can include a query that comprises one or more terms unknown to the machine learning module, as trained, a query that includes multiple questions, or a query that is ambiguous, etc. In a few embodiments, a question determined as not-answerable in block 730 for including unknown terms can eventually be determined to be answerable (e.g., objective or subjective, etc.) after the machine learning module is repeatedly trained in block 730.

In a number of embodiments, method 700 further can include a block 740 of determining whether the query type, as determined in block 730, is not-answerable or answerable. Block 740 can be similar or identical to block 420 (FIG. 4). Examples of an answerable query type can be any types other than not-answerable, such as objective or subjective, product features, manufacturer information, brand recommendation, product using tips, etc. In many embodiments, when the query type is not-answerable, block 740 can return to block 730 to wait until receiving another query from the user device. In some embodiments, before returning to block 730, block 740 further can include transmitting, via the computer network (e.g., computer network 340 (FIG. 3)) and to the user device (e.g., user device(s) 320 (FIG. 3)), a message for retry to facilitate a display of the message for retry on a graphical user interface on the user device.

Still referring to FIG. 7, in many embodiments, method 700 further can include a block 750 of determining, in real-time and based at least in part on the query type (as determined in block 740 as being answerable), an answer retrieval module from the query-type-specific answer retrieval modules (e.g., answer retrieval module(s) 3120 (FIG. 3), objective answer retrieval module 3120 (FIG. 3)), and/or subjective answer retrieval module 3122 (FIG. 3)), as trained in block 720. Block 750 can be similar or different from block 430 (FIG. 4).

In a number of embodiments, method 700 further can include a block 760 of determining, in real-time by the answer retrieval module (e.g., answer retrieval module(s) 3120 (FIG. 3)), one or more answers for the query. Block 760 can be similar or different from block 440 (FIG. 4). In many embodiments, block 760 can include: (a) generating, by a query encoding module, a query vector for the query; (b) generating, by a context encoding module, a respective context vector generated for each of the one or more answers; (c) determining a respective similarity score between the query and each of the one or more answers based on a predetermined equation of the query vector and the respective context vector; and (d) determining the one or more answers based on the respective similarity score between the query and each of the one or more answers. The query encoding module can be similar or different from the context encoding module. Examples of the query encoding module and/or the context encoding module can include BERT encoders, or RoBERTa encoders, etc.

In some embodiments, method 700 additionally can include a block 770 of ranking, in real-time, the one or more answers based on a user profile of the user. Block 770 can be similar or different from block 450 (FIG. 4) or block 610 (FIG. 6). For example, the ranking can be determined based on the user's preferences associated the item(s) or product(s) determined from the user behavior data (e.g., transaction history and/or engagement history) and/or preference settings stored in the user profile. In several embodiments, block 770 further can rank the one or more answers based on additional factors, such as featured products and/or brands, policies of the retailer, and/or the popularity of the answer(s), etc. In a number of embodiments, method 700 and/or block 770 further can include one or more procedures, processes, and/or activities similar or different from block 620 (FIG. 6) and/or block 630 (FIG. 6).

In many embodiments, method 700 further can include a block 780 of transmitting, via the computer network (e.g., computer network 340 (FIG. 3)) and to the user device (e.g., user device 320 (FIG. 3)), at least one of the one or more answers, as ranked or determined in block 770, to facilitate a display of the at least one of the one or more answers on a graphical user interface on the user device. Block 780 can be similar or different from block 460 (FIG. 4).

In a number of embodiments, method 700 also can include a block 790 of receiving, via the computer network (e.g., computer network 340 (FIG. 3)) and to the user device (e.g., user device 320 (FIG. 3)), feedback for the at least one of the one or more answers. Block 790 can be similar or different from block 470 (FIG. 4). The feedback received in block 790 can be used for: (a) determining the respective training data for the query-type-specific answer retrieval modules in blocks 710 and/or the training data for the machine learning module used in block 730; and/or (b) updating the user preferences stored in the user profile used in block 770. In some embodiments, method 700 and/or block 790 further can include one or more procedures, processes, and/or activities similar or different from block 480 (FIG. 4) and/or block 490 (FIG. 4) for further interacting with the user.

Various embodiments can include a system for generating one or more answer to a query. In many embodiments, the system can include one or more processors; and one or more non-transitory computer-readable media storing computing instructions configured to, when run on the one or more processors, cause the one or more processors to perform one or more acts. In a number of embodiments, the one or more acts can include determining, based on data sources, respective training data for each of query-type-specific answer retrieval modules. The data sources can include: (a) feature descriptions associated with products; and/or (b) discussions that are associated with the products and generated by members of an online forum.

In some embodiments, the act of determining the respective training data can include selecting a respective query and a respective context of each of query-context pairs of the respective training data based on one or more respective quality indications for the respective context. Each of the query-context pairs of the respective training data further can include a respective query post and at least one respective top-level comment (e.g., at least one of the top-3 comments, etc.) for the respective query post.

In a few embodiments, the one or more respective quality indications for selecting the respective query and the respective context of each of the query-context pairs can include one or more of: (a) whether a thread of the threads from the online forum comprises at least one top-level comment corresponding to a query post of the thread; or (b) a respective review, author, status, or length of the at least one top-level comment of the thread.

In a number of embodiments, the one or more acts further can include training each of the query-type-specific answer retrieval modules, based on the respective training data and a respective input query type for each of the query-type-specific answer retrieval modules, to determine one or more respective contexts for the input query. In some embodiments, the act of training each of the query-type-specific answer retrieval modules can include: (a) training a respective query encoding module to generate a respective training query vector for the respective query of each of the query-context pairs of the respective training data for each of the query-type-specific answer retrieval modules; and/or (b) training a respective context encoding module to generate a respective training context vector for the respective context of each of the query-context pairs of the respective training data for each of the query-type-specific answer retrieval modules.

In a number embodiments, the one or more acts further can include determining, in real-time by machine learning, a query type of a query from a user device for a user. In some embodiments, the act of determining the query type can include using a query classification module trained to determine the query type. In several embodiments, the one or more acts further can include training the query classification module to determine a user query type of a user query based on classifier training data retrieved from the data sources.

In many embodiments, the query types for user queries can include objective/facts, subjective/opinions, etc. In some embodiments, the query types further can include not-answerable. When the query type for a query, as determined, is not-answerable, the one or more acts further can include transmitting, via the computer network and to the user device, a message for retry (e.g., "I don't understand. Please ask again.") to facilitate a display of the message for retry on a graphical user interface on a user device. After determining that the query type is not-answerable, the one or more acts further can include not performing any additional actions, and waiting for the next user input (e.g., a command, a new or reworded query, etc.).

In a number of embodiments, the one or more acts additionally can include determining, in real-time and based at least in part on the query type of the query, an answer retrieval module from the query-type-specific answer retrieval modules, as trained. The answer retrieval module, as determined from the query-type-specific answer retrieval modules, as trained, can be configured to determine one or more answers for a query based on a respective similarity score between the query and each of the one or more answers. In certain embodiments, the respective similarity score between the query and each of the one or more answers for the query can be determined based on: (a) a query vector generated by the respective query encoding module for the query, and (b) a respective context vector generated by the respective context encoding module for each of the one or more answers.

In a number embodiments, the one or more acts further can include determining, in real-time by the answer retrieval module, one or more answers for the query.

In a number embodiments, the one or more acts further can include ranking, in real-time, the one or more answers based on a user profile of the user (e.g., the user's preferences determined based on statistics and/or obtained).

In a number embodiments, the one or more acts further can include transmitting, via a computer network and to the user device, at least one of the one or more answers, as ranked, to facilitate a display of the at least one of the one or more answers, as ranked, on a graphical user interface on the user device. In some embodiments, the one or more acts further can include before transmitting the at least one of the one or more answers to facilitate the display of the at least one of the one or more answers, refining, in real-time, the at least one of the one or more answers for the query, as ranked, based at least in part on an answer length limit. For example, refining can include reducing a respectively word count of each of the at least one of the one or more answers to no more than 250 words, 300 words, or 500 words, etc. and/or regenerating, via a suitable NLP model (e.g., GPT-2, GPT-3, etc.), the at least one of the one or more answers.

In many embodiments, after transmitting the at least one of the one or more answers for the query to the user device, the one or more acts further can include: (a) transmitting, via the computer network and to the user device, a request for feedback (e.g., "Tell us about your experience.", or "How do you like the answers?") to facilitate a display of the request for feedback on the graphical user interface on the user device; and/or (b) receiving, via the computer network and from the user device, feedback for the at least one of the one or more answers. In certain embodiments, the user can voluntarily provide the feedback (e.g., the feedback is received without any request for feedback). The feedback can be in any suitable forms (e.g., texts, voice messages, etc.).

In some embodiments, the one or more acts additionally can include one or more of: (a) training each of the query-type-specific answer retrieval modules further comprises re-training each of the query-type-specific answer retrieval modules further based on the feedback, as received; (b) when the feedback is negative (e.g., "The answers are off.", "You did not answer my question.", or "I am not satisfied with the answers.", etc.), transmitting, via the computer network and to the user device, a message for retry (e.g., "Try again?") to facilitate a display of the message for retry on the graphical user interface; or (c) when the feedback is positive (e.g., "I am happy with the answers.", or "The answers are good.", etc.), transmitting, via the computer network and to the user device, a message for an additional query to facilitate a display of the message for the additional query on the graphical user interface.

Various embodiments can include a method. The method can be implemented via execution of computing instructions configured to run at one or more processors and stored at one or more non-transitory computer-readable media, the method can include one or more acts. In many embodiments, the one or more acts can include determining, based on data sources, respective training data for each of query-type-specific answer retrieval modules. The data sources can include feature descriptions associated with products; and/or discussions that are associated with the products and generated by members of an online forum. In a number of embodiments, the act of determining the respective training data can include selecting a respective query and a respective context of each of query-context pairs of the respective training data based on one or more respective quality indications for the respective context.

In many embodiments, the one or more acts further can include training each of the query-type-specific answer retrieval modules, based on the respective training data and a respective input query type for each of the query-type-specific answer retrieval modules, to determine one or more respective contexts for the input query.

In a number of embodiments, the one or more acts further can include determining, in real-time by machine learning, a query type of a query from a user device for a user. The one or more acts further can include determining, in real-time and based at least in part on the query type, an answer retrieval module from the query-type-specific answer retrieval modules, as trained.

In some embodiments, the one or more acts further can include determining, in real-time by the answer retrieval module, one or more answers for the query. The one or more acts further can include ranking, in real-time, the one or more answers based on a user profile of the user.

In a number of embodiments, the one or more acts further can include transmitting, via a computer network and to the user device, at least one of the one or more answers, as ranked, to facilitate a display of the at least one of the one or more answers, as ranked, on a graphical user interface on the user device.

In many embodiments, the techniques described herein can provide a practical application and several technological improvements. In some embodiments, the techniques described herein can provide for automatic generation of answers for queries (if answerable), both objective and subjective, from users in an ecommerce environment. These techniques described herein can provide a significant improvement over conventional approaches of providing answers from predetermined frequently asked questions (FAQ) and/or human agents. The answers in the predetermined FAQs generally are associated with objective information, such as product features (e.g., the length of a belt or the color of a lipstick, etc.), but not subjective recommendations (e.g., brand recommendation or tips on how to use a product, etc.). The conventional approaches thus are limited in scope of the types of queries that the approaches can handle.

Further, the techniques described herein can provide additional significant improvements over conventional approaches, such as: (a) using one or more machine learning and/or NLP modules trained to generate and/or refine conversational answers for user queries in real-time; (b) automatically generating training data for training the machine learning and/or NLP module(s) (e.g., query classifying module 3110 (FIG. 3), answer retrieval module(s) 3120 (FIG. 3), etc.); (c) selectively determining data of good quality from the data sources (e.g., threads with indications of good quality from online forums) to be included in the training data for the answer retrieval module(s) (e.g., subjective answer retrieval module 3122 (FIG. 3)); (d) generating more satisfying results (e.g., personalized and/or featured answers) based on user profiles and/or promotion goals; and so forth.

In many embodiments, the techniques described herein can be used in real-time and continuously at a scale that cannot be handled using manual techniques. For example, the number of products or product features in product catalogs and/or discussions in online forums to be searched in each of the one or more data sources can easily exceed thousands, and thus determining the answer(s) for a query from the thousands of items in the each of the one or more data sources cannot be handled, in real-time, by human beings. Further, determining the answer(s) for a query based on a respective similarity score between a query and each of the potential answers in a data source cannot be handled, in real-time, by manual techniques because the techniques described herein includes encoding the query and the each of the potential answers into vectors and determining the respective similarity score based on the vectors.

In a number of embodiments, the techniques described herein can solve a technical problem that arises only within the realm of computer networks, as product features and/or discussions in an online forum do not exist outside the realm of computer networks. Moreover, the techniques described herein can solve a technical problem that cannot be solved outside the context of computer networks. Specifically, the techniques described herein cannot be used outside the context of computer networks, in view of a lack of data.

Although automatic generation of answers for user queries has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-7 may be omitted and/or modified, and that the foregoing discussion of certain of these embodiments does not necessarily represent a complete description of all possible embodiments. For example, one or more of the procedures, processes, or activities of FIGS. 4-7 may include different procedures, processes, and/or activities and be performed by many different modules, in many different orders. One or more of the procedures, processes, or activities of FIGS. 4-7 (e.g., determining the query type of a query, training the one or more machine learning and/or NLP modules for classifying the user queries, encoding the query-context pairs of the training data, and/or retrieving answers, determining the answer retrieval module to be used, etc.) may be omitted. As another example, one or more of the modules, elements, and/or systems within system 300 or system 310 in FIG. 3 can be interchanged, omitted, or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable media storing computing instructions configured to, when run on the one or more processors, cause the one or more processors to perform:
determining, based on data sources, respective training data for each of query-type-specific answer retrieval modules, wherein:
the data sources comprise:
feature descriptions associated with products; and
discussions that are associated with the products and generated by members of an online forum; and
determining the respective training data comprises selecting a respective query and a respective context of each of query-context pairs of the respective training data based on one or more respective quality indications for the respective context;
training each of the query-type-specific answer retrieval modules, based on the respective training data and a respective input query type for each of the query-type-specific answer retrieval modules, to determine one or more respective contexts for an input query;
determining, in real-time by machine learning, a query type of a query from a user device for a user;
determining, in real-time and based at least in part on the query type, an answer retrieval module from the query-type-specific answer retrieval modules, as trained;
determining, in real-time by the answer retrieval module, one or more answers for the query;
ranking, in real-time, the one or more answers based on a user profile of the user; and
transmitting, via a computer network and to the user device, at least one of the one or more answers, as ranked, to facilitate a display of the at least one of the one or more answers, as ranked, on a graphical user interface on the user device.

2. The system in claim 1, wherein:
training each of the query-type-specific answer retrieval modules further comprises:
training a respective query encoding module to generate a respective training query vector for the respective query of each of the query-context pairs of the respective training data for each of the query-type-specific answer retrieval modules; and
training a respective context encoding module to generate a respective training context vector for the respective context of each of the query-context pairs of the respective training data for each of the query-type-specific answer retrieval modules.

3. The system in claim 2, wherein:
the answer retrieval module is configured to determine the one or more answers for the query based on a respective similarity score between the query and each of the one or more answers; and
the respective similarity score is determined based on: (a) a query vector generated by the respective query encoding module for the query, and (b) a respective context vector generated by the respective context encoding module for each of the one or more answers.

4. The system in claim 1, wherein:
each of the query-context pairs of the respective training data further comprises a respective query post and at least one respective top-level comment for the respective query post.

5. The system in claim 1, wherein:
the one or more respective quality indications for selecting the respective query and the respective context of each of the query-context pairs comprise one or more of:
whether a thread of the threads from the online forum comprises at least one top-level comment corresponding to a query post of the thread; or
a respective review, author, status, or length of the at least one top-level comment of the thread.

6. The system in claim 1, wherein the computing instructions are further configured to, when run on the one or more processors, cause the one or more processors to perform:
after transmitting the at least one of the one or more answers for the query to the user device, receiving, via the computer network and from the user device, feedback for the at least one of the one or more answers; and
one or more of:
training each of the query-type-specific answer retrieval modules further comprises re-training each of the query-type-specific answer retrieval modules further based on the feedback;
when the feedback is negative, transmitting, via the computer network and to the user device, a message for retry to facilitate a display of the message for retry on the graphical user interface; or
when the feedback is positive, transmitting, via the computer network and to the user device, a message for an additional query to facilitate a display of the message for the additional query on the graphical user interface.

7. The system in claim 1, wherein:
when the query type, as determined, is not-answerable, the computing instructions are further configured to, when run on the one or more processors, cause the one or more processors to perform transmitting, via the computer network and to the user device, a message for retry to facilitate a display of the message for retry on the graphical user interface.

8. The system in claim 1, wherein the computing instructions are further configured to, when run on the one or more processors, cause the one or more processors to perform:
refining, in real-time, the at least one of the one or more answers for the query, as ranked, based at least in part on an answer length limit.

9. The system in claim 1, wherein:
determining the query type comprises using a query classification module trained to determine the query type.

10. The system in claim 9, wherein the computing instructions are further configured to, when run on the one or more processors, cause the one or more processors to perform:
training the query classification module to determine a user query type of a user query based on classifier training data retrieved from the data sources.

11. A method being implemented via execution of computing instructions configured to run at one or more processors and stored at one or more non-transitory computer-readable media, the method comprising:
determining, based on data sources, respective training data for each of query-type-specific answer retrieval modules, wherein:
the data sources comprise:
feature descriptions associated with products; and
discussions that are associated with the products and generated by members of an online forum; and
determining the respective training data comprises selecting a respective query and a respective context of each of query-context pairs of the respective training data based on one or more respective quality indications for the respective context;
training each of the query-type-specific answer retrieval modules, based on the respective training data and a respective input query type for each of the query-type-specific answer retrieval modules, to determine one or more respective contexts for an input query;
determining, in real-time by machine learning, a query type of a query from a user device for a user;
determining, in real-time and based at least in part on the query type, an answer retrieval module from the query-type-specific answer retrieval modules, as trained;
determining, in real-time by the answer retrieval module, one or more answers for the query;
ranking, in real-time, the one or more answers based on a user profile of the user; and
transmitting, via a computer network and to the user device, at least one of the one or more answers, as ranked, to facilitate a display of the at least one of the one or more answers, as ranked, on a graphical user interface on the user device.

12. The method in claim 11, wherein:
training each of the query-type-specific answer retrieval modules further comprises:
training a respective query encoding module to generate a respective training query vector for the respective query of each of the query-context pairs of the respective training data for each of the query-type-specific answer retrieval modules; and
training a respective context encoding module to generate a respective training context vector for the respective context of each of the query-context pairs of the respective training data for each of the query-type-specific answer retrieval modules.

13. The method in claim 12, wherein:
the answer retrieval module is configured to determine the one or more answers for the query based on a respective similarity score between the query and each of the one or more answers; and
the respective similarity score is determined based on: (a) a query vector generated by the respective query encoding module for the query, and (b) a respective context vector generated by the respective context encoding module for each of the one or more answers.

14. The method in claim 11, wherein:
each of the query-context pairs of the respective training data further comprises a respective query post and at least one respective top-level comment for the respective query post.

15. The method in claim 11, wherein:
the one or more respective quality indications for selecting the respective query and the respective context of each of the query-context pairs comprise one or more of:
whether a thread of the threads from the online forum comprises at least one top-level comment corresponding to a query post of the thread; or
a respective review, author, status, or length of the at least one top-level comment of the thread.

16. The method in claim 11, further comprising:
after transmitting the at least one of the one or more answers for the query to the user device, receiving, via the computer network and from the user device, feedback for the at least one of the one or more answers; and
one or more of:
training each of the query-type-specific answer retrieval modules further comprises re-training each of the query-type-specific answer retrieval modules further based on the feedback;
when the feedback is negative, transmitting, via the computer network and to the user device, a message for retry to facilitate a display of the message for retry on the graphical user interface; or
when the feedback is positive, transmitting, via the computer network and to the user device, a message for an additional query to facilitate a display of the message for the additional query on the graphical user interface.

17. The method in claim 11, further comprising:
when the query type, as determined, is not-answerable, transmitting, via the computer network and to the user device, a message for retry to facilitate a display of the message for retry on the graphical user interface.

18. The method in claim 11, further comprising:
refining, in real-time, the at least one of the one or more answers for the query, as ranked, based at least in part on an answer length limit.

19. The method in claim 11, wherein:
determining the query type comprises using a query classification module trained to determine the query type.

20. The method in claim 19, further comprising:
training the query classification module to determine a user query type of a user query based on classifier training data retrieved from the data sources.

* * * * *